United States Patent Office.

ORAZIO LUGO, OF NEW YORK, N. Y., ASSIGNOR TO DAVID LYMAN, ROSS C. BROWNING, AND MASON C. WELD.

Letters Patent No. 81,185, dated August 18, 1868.

IMPROVED PROCESS OF PRESERVING ANIMAL SUBSTANCES.

*The Schedule referred to in these Letters Patent and making part of the same.*

---

Be it known that I, ORAZIO LUGO, of the city, county, and State of New York, have invented a new and useful Method for Preserving Animal Substances from Putrefaction; and that the following is a clear and exact description thereof.

Experiments have proved to me that when phenal (carbolic acid) is slowly administered to a living animal until death takes place, the result is, that after dissection the different parts of the animal will not undergo putrefaction for a considerable length of time, while the flesh or meat, skin or hide, &c., does not differ, either in taste or quality, from those killed in the usual manner.

There are several ways in which my invention can be successfully applied, nevertheless they are all based upon one principle, and that is, the introduction of either phenol, cumol, or xylol, into the system while the animal is still alive for the purpose of diffusing the above-named substances throughout its system.

The operation is conducted as follows:

I connect a retort containing phenal (carbolic acid) to a large vessel or receiver, in which I place the animal; then I apply heat to the retort, and by means of a current of air introduced into the retort, the carbolic-acid vapors are propelled and diffused into the receiver or receptacle containing the said animals; the latter soon die, and do not putrefy after dissection. Said animals can also be removed from the vessel, before they are dead, when it is desired to bleed them.

What I claim as my invention, and desire to secure by Letters Patent, is—

1. Introducing phenal, or any of its equivalents, into the system of a living animal or animals until death takes place, for the purpose substantially as herein specified.

2. Introducing or diffusing phenol, or any of its equivalents, into the system of a living animal or animals just before bleeding or killing the said animals, for the purpose substantially as herein specified.

3. The within-described method of introducing phenol (carbolic acid) or its homologues, into the system of living animals, for the purpose substantially as herein described.

ORAZIO LUGO.

Witnesses:
EDM. F. BROWN,
JNO. D. PATTEN.